United States Patent [19]

Tewksbury

[11] 3,831,167

[45] Aug. 20, 1974

[54] DIGITAL-TO-ANALOG CONVERSION USING MULTIPLE DECODERS

[75] Inventor: Stuart Keene Tewksbury, Middletown, N.J.

[73] Assignee: Bell Telephone Laboratories, Incorporated, Murray Hill, N.J.

[22] Filed: Nov. 8, 1972

[21] Appl. No.: 304,643

[52] U.S. Cl. ........ 340/347 DA, 325/38 R, 325/38 B, 332/11 D

[51] Int. Cl. .......... H03k 13/22

[58] Field of Search. 340/347 DA, 347 NT:347 DD; 325/38 R, 38 B; 332/9 R, 9 T, 11 D; 179/15 AP

[56] References Cited

UNITED STATES PATENTS

| | | | |
|---|---|---|---|
| 3,609,552 | 9/1971 | Limb, Mounts | 325/38 B |
| 3,707,680 | 12/1972 | Gabbard et al. | 325/38 B |
| 3,723,879 | 4/1973 | Kaul et al. | 325/38 R |
| 3,736,508 | 5/1973 | Sparrendahl | 325/38 R |

OTHER PUBLICATIONS

Beraud, "Pulse Code Modulation To Delta Converter," IBM Tech. Disclosure Bulletin, Vol. 15, No. 8, Jan. 1973, pp. 2461–2462.

"Impact of Large-Scale Integrated Circuits on Common Circuits," McDonald Nat. Electr. Conf. Proceedings, 1968, Vol. 24, pp. 569–572.

*Primary Examiner*—Charles E. Atkinson
*Assistant Examiner*—Vincent J. Sunderick
*Attorney, Agent, or Firm*—C. S. Phelan

[57] ABSTRACT

A technique and apparatus are described for converting a digital signal to analog form wherein pulse code modulated signals are first converted to a differential pulse code modulated format. The differential pulse code modulated signal is then partitioned and the sign of the sample is associated with each segment. Each partitioned signal segment is applied to a control register of a binary rate multiplier. The binary rate multiplier generates a pulse train representing a delta modulated signal format wherein the number of pulses in the train is equal to the numerical value of the partitioned signal segment. These delta modulated-type signals are decoded in analog integrators, each segment of the analog signal is scaled in accordance with the partitioned differential pulse code modulated sample value, and the segments are combined to form a composite analog signal having a value which corresponds to the original pulse code modulated digital sample.

12 Claims, 5 Drawing Figures

PATENTED AUG 20 1974 3,831,167

SHEET 2 OF 4

DIGITAL-TO-ANALOG CONVERSION USING MULTIPLE DECODERS

BACKGROUND OF THE INVENTION

1. Field of the Invention

This invention relates to digital to analog signal conversion and, in particular, to methods and apparatus for effecting such signal conversion by the use of multiple binary rate multiplier decoding circuits.

2. Description of the Prior Art

With the current trend toward the development of digital transmission systems, much emphasis has been directed toward the economic exploitation of the advantages of large scale integration of the requisite circuitry. In pursuance of this end, a considerable amount of effort has been focused on the development of high-speed, efficient, and inexpensive analog-to-digital conversion techniques and apparatus. In contrast, a much smaller effort has been directed to the problem of converting the transmitted digital signal back to analog form.

In the straightforward approach to converting a large sample word length signal of approximately 15 bit accuracy it would be necessary to maintain the accuracy of the least significant current source in the binary decoding ladder to one part in 32,768. Such accuracies are extremely difficult to maintain in a system subjected to the operating environment of a telephone central office. Moreover, the component tolerances necessary to hold such accuracies require careful component selection and, in some cases, a time consuming and expensive matching of component characteristics.

If, on the other hand, a delta modulation type encoder and decoder is employed, the laborious matching of component characteristics can be avoided. While this approach appears to circumvent a very serious problem, it does so at the expense of creating still another serious drawback. This latter problem bears directly on the operating speed of the requisite circuitry. For a 15 bit accuracy in a delta modulation scheme, better than 32,000 signal comparisons would have to be made at approximately an 8 kHz rate. This results in a circuit operating speed on the order of 250 MHz. Operating speeds, such as this, are uneconomical and difficult to achieve in mass producible devices.

Accordingly, one object of the present invention is to reduce the circuit operating speeds needed to accurately decode large word length digital signals having accuracies on the order of 15 bits.

Another object is to eliminate the laborious and expensive matching of component characteristics necessary to support digital signal accuracies on the order of 15 bits.

Still another object is to reduce component tolerances necessary to effect the conversion of large word length digital samples to analog form.

Yet another object is to reduce the decoding circuit accuracies while maintaining the overall signal accuracy.

A still further object is to develop a decoding method and apparatus which lends itself to mass production techniques such as large scale integration.

SUMMARY OF THE INVENTION

The foregoing and other objects of the invention are realized in an illustrative embodiment wherein pulse code modulated (PCM) digital signal samples are converted to a differential pulse code modulated (DPCM) signal format. The DPCM signal is partitioned into at least two segments and the sign bit of the DPCM signal is associated with each segment. A binary rate multiplier, having the partitioned DPCM signal segment applied to its control register, generates a pulse train representing a delta modulated signal format for each of the partitioned samples. Each of the pulse trains so generated has a number of pulses in the train equal to the numerical value of the partitioned signal segment. By integrating each of these delta modulated type signals, the representative analog signal is obtained. After scaling each of the analog signals in amplitude in proportion to the relative weight of the partitioned signal segment in the DPCM sample, the resulting signals are combined and a composite analog signal is formed which is equal in magnitude to the original digital signal representation.

Accordingly, it is one feature of the present invention that digital signals having accuracies on the order of 15 bits can be accurately decoded to analog form by circuitry operating at speeds substantially lower than that normally considered necessary for converting signals of such accuracy.

Another feature of the present invention is that the analog signal is linearly interpolated between adjacent signal samples.

Another feature of the present invention is that the decoding can be effected on a hold and then interpolate basis.

Still another feature of the present invention is that the digital signal sample rate and the binary rate multiplier clock rate are not required to be binary multiples of one another.

BRIEF DESCRIPTION OF THE DRAWINGS

The aforementioned features and objects of the invention, as well as other features and objects, will be better understood upon a consideration of the following detailed description and the appended claims in connection with the attached drawings of an illustrative embodiment in which:

DETAILED DESCRIPTION

Figure 1:
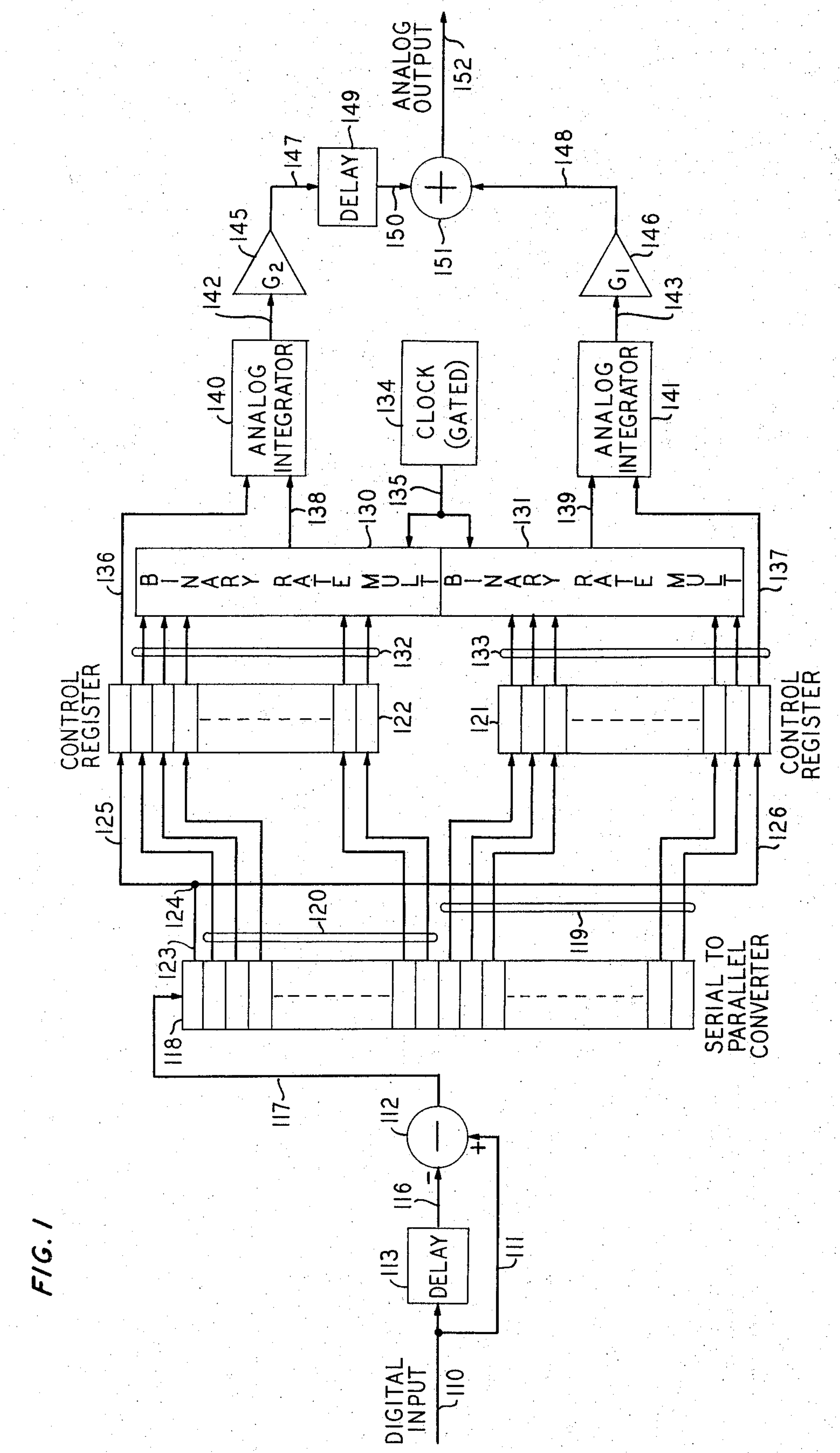
FIG. 1 is a block diagram of a digital to analog converter circuit.

The digital-to-analog converter illustrated in FIG. 1 includes circuitry for converting a pulse code modulated (PCM) digital signal into a differential pulse code modulated (DPCM) signal. The PCM signal is applied to input circuit 110. A portion of this signal is applied directly through circuit 111 to subtractor 112. The other portion of the PCM signal is delayed in time by a full PCM sample interval by means of delay network 113. This delaying operation brings a PCM signal sample which occurred one sample time interval in the past into time alignment with the present PCM signal. Correspondingly, that portion of the present PCM signal which is being delayed in delay network 113 will be brought into time coincidence with a PCM signal which will occur in an adjacent time interval in the future. With the delayed PCM signal applied to the negative input of subtractor 112 over circuit 116 and with the undelayed signal applied to the positive input of subtractor 112, upon subtraction the difference between the present signal and one just past is obtained. This difference signal is typically referred to as a differential pulse code modulated signal (DPCM).

Following conversion of the PCM signals to a DPCM format, the bit serial organized signal is converted to a parallel bit organization. This bit organization conversion is effected in a serial-to-parallel bit converter 118. The DPCM signal is fed to serial-to-parallel converter 118 over circuit 117.

The (M+1) bits of a DPCM word out of serial-to-parallel converter 118 are organized in decreasing significance from a most significant sign bit to a least significant signal bit. This least significant bit represents the incremental encoding step size. The parallel bit organized DPCM signal is partitioned at the end of each input DPCM character by timing circuits (not separately shown) whereby N least significant bits out of M total signal bits are routed over circuits 119 to control register 121. With N out of M bits applied to control register 121, the remainder of the signal bits, (M−N), are applied to control register 122 over circuits 120.

The M referred to above corresponds to the total number of signal bits in the DPCM signal excluding the most significant sign bit. Accordingly, the total number of bits in the DPCM signal is (M+1) or M′. The N referred to above represents the number of least significant bits in a partitioned segment of the DPCM signal. For the example used herein, if the number of signal bits M is even, N is equal to M/2. Where M is odd, N is equal to (M+1)/2. The plus and minus sign indicates that one segment has an additional bit over that of the other segment.

The sign bit of the M′ bit DPCM signal is routed over circuit 123 to circuit node 124. Circuit 125 carries this sign bit to the most significant bit position in control register 122. Correspondingly, circuit 126 carries the same sign bit to the most significant bit position in control register 121.

At this point the M′ bit DPCM signal has been partitioned into two segments, each segment having a quantization weight in accordance with the relative value of the segment in the differential digital signal, with N signal bits plus a sign bit applied to control register 121 and (M−N) signal bits plus the same sign bit applied to control register 122. Control registers 121 and 122 hold the partitioned DPCM signal segments for utilization by the binary rate multipliers 130 and 131 during the succeeding DPCM word time.

Figure 2:
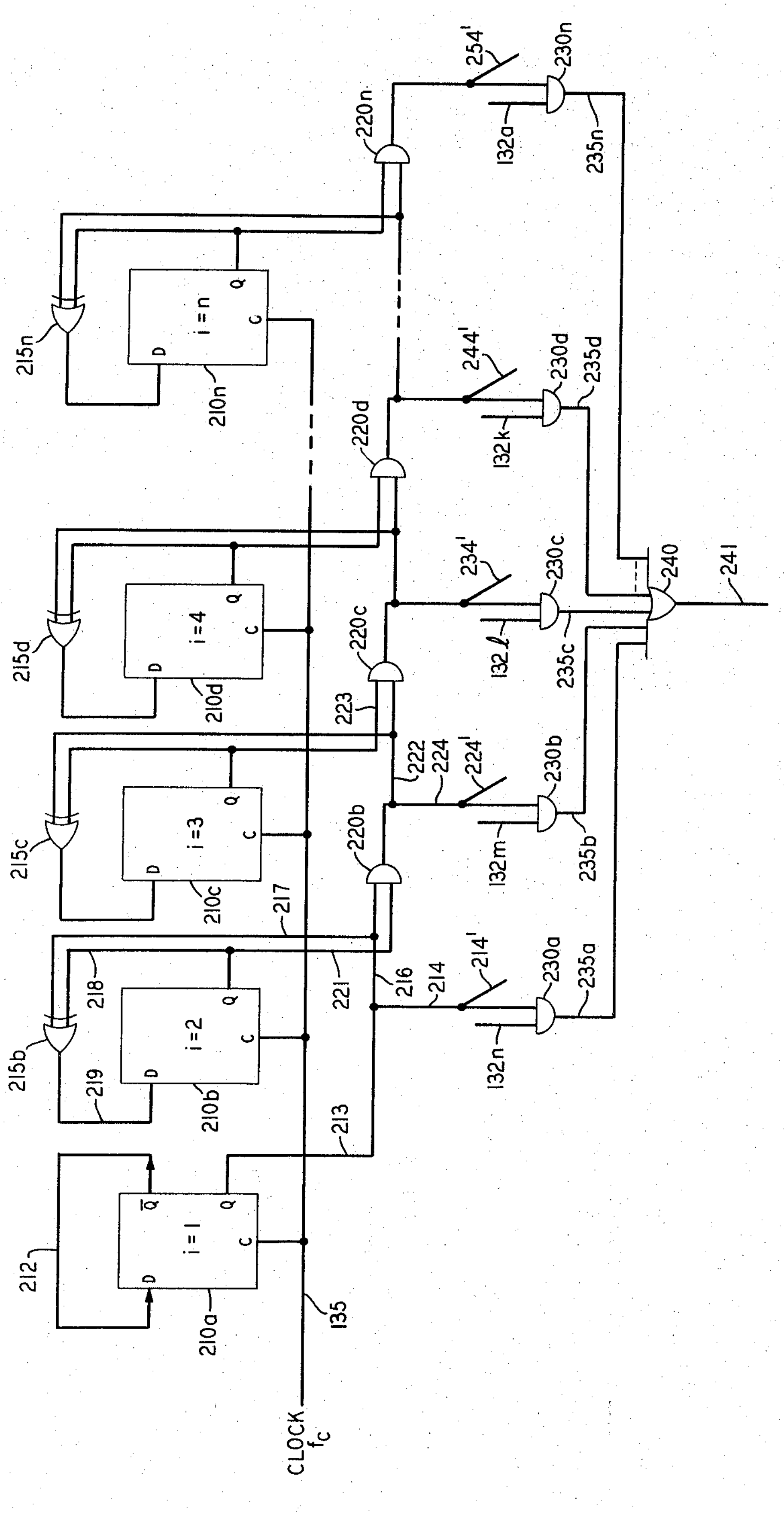
FIG. 2 is a simplified schematic representation of a binary rate multiplier.

The binary rate multipliers 130 and 131 are schematically illustrated in FIG. 2. The basic structure of such a multiplier is a series of $n$ interconnected flip-flops **210*a* through 210*n*. As will be shown later the series of flip-flops 210*a* through 210*n* are used by both binary rate multipliers 130 and 131. A clock signal $f_c$ from clock source 134, shown in FIG. 1, is distributed to each of the flip-flops 210*a* through 210*n* over circuit 135. By connecting the $\bar{Q}$ output of flip-flop 210*a* to the D input through circuit 212, the clock signal frequency is divided in half. This result becomes evident if one considers the case wherein the Q output of flip-flop 210*a* is initially set at 0. With Q at 0 the $\bar{Q}$ output is a 1, as is the D input. When a clock pulse occurs the flip-flop 210*a* changes state with the Q output becoming a 1. Since the Q output is a 1, the $\bar{Q}$ output is 0 and at the next clock pulse flip-flop 210*a*** again changes state. The end result is a halving of the clock signal frequency.

The Q output of flip-flop **210*a* is connected to AND gate 230*a* by circuits 213 and 214 and to AND gate 220*b* by circuit 216. The Q output of flip-flop 210*a* is further connected to EXCLUSIVE OR gate 215*b* by circuit 217. The other input to EXCLUSIVE OR gate 215*b* receives the Q output signal of flip-flop 210*b* via circuit 218. Assuming the Q output of flip-flop 210*b* is initially a 0 and also assuming the Q output of flip-flop 210*a* is also a 0, then the output of EXCLUSIVE OR gate 215*b* is a 0. This signal is applied to the D input of flip-flop 210*b* by circuit 219. When the next available clock pulse occurs the Q output of flip-flop 210*a* becomes a 1 but the Q output of flip-flop 210*b* remains a 0. With the change of state of flip-flop 210*a*, EXCLUSIVE OR gate 215*b* changes its output to a 1. A 1 being delivered to the D input of flip-flop 210*b* causes the output to change to a 1 with the next clock pulse. Consequently, flip-flop 210*b* acts to halve the frequency of the signal out of flip-flop 210*a*** or to quarter the clock signal frequency.

Extending the above operating details to flip-flops **210*c* through 210*n*, it is readily evident that flip-flop 210*c* acts to divide the clock signal frequency by a factor of 8, flip-flop 210*d*** divides the clock signal frequency by a factor of 16 and so on. The number of stages, $n$, employed is dependent upon the number of signal bits occurring in each segment of the partitioned DPCM signal.

By applying the outputs of flip-flops **210*a* and 210*b* to AND gate 220*b* by circuits 213, 216 and 221, respectively, the resultant signal is a train of pulses with one pulse occurring for every four clock pulses. This is more clearly illustrated in FIG. 3 by the signal labelled $f_2$. Similarly, the connection of the output of AND gate 220*b* to AND gate 220*c* via circuit 222 and the connection of the output of flip-flop 210*c* to AND gate 220*c* via circuit 223 provides circuit means for producing a train of pulses out of AND gate 220*c* with one pulse occurring for every eight clock pulses. The signal out of AND gate 220*c* is illustrated as $f_3$ in FIG. 3. Again the above operative details can be applied to AND gates 220*d* through 220*n* with the result that an output pulse is produced once for every $2^n$ clock pulses. The signal for the case where $n$ is equal to four is labelled as $f_4$ in FIG. 3.**

Further reference to FIG. 2 shows that the Q output of flip-flop **210*a* is connected to AND gate 230*a* through circuits 213 and 214. The other input to AND gate 230*a* is derived from control register 122, shown in FIG. 1, over one of the circuits in circuit group 132. Specifically, the most significant signal bit, excluding the sign bit, is applied to AND gate 230*a* by circuit 132*n*. One input of AND gate 230*b* is obtained from AND gate 220*b* via circuit 224 while the other input is obtained from control register 122. In this case, the next most significant signal bit, excluding the sign bit, is applied to AND gate 230***b* on circuit 132*m*. Similar circuit connections bring the remainder of the signal bits into the balance of AND gates labelled 230*c* through 230*n*. The outputs of AND gates 230*a* through 230*n* are connected to OR gate 240 by circuits 235*a* through 235*n*, respectively.

Figure 3:
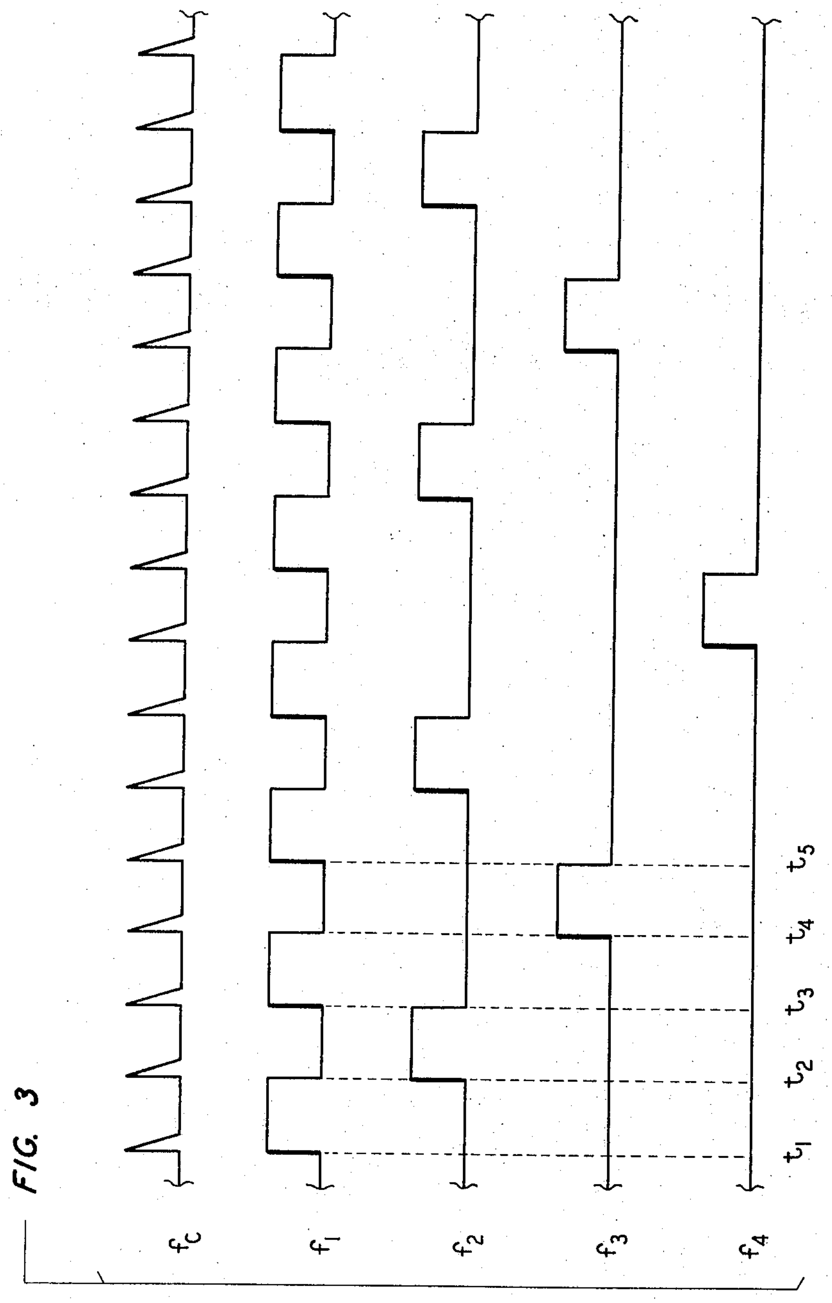
FIG. 3 is a family of timing waveforms illustrative of the operation of the binary rate multiplier.

With this arrangement the output 241 of OR gate 240 is a train of pulses wherein the number of pulses is equal to the analog magnitude of the binary signal segment applied on circuits 132*a* through 132*n*. For example, assume a binary signal segment having four signal bits with a composition of 1011. Therefore, a 1 is applied to AND gate 230*a* on circuit 132*n*, a 0 is applied to AND gate 230*b* on circuit 132*m*, and 1's are applied to AND gates 230*c* and 230*d* on circuits 132*l* and 132*k*, respectively. As a result eight pulses will be delivered over circuit 235*a*, two pulses will be delivered over circuit 235*c*, and one pulse will appear on circuit 235*d*. Since the 0 to 1 pulse transitions are mutually exclusive, as shown in FIG. 3, by the heavy line on the leading edge of the pulses, the output of OR gate 240 will be a train of 11 pulses. This is the analog value of the digital representation. It should be noted that a new pulse train is produced each time a new signal segment is supplied to the control registers 121 and 122.

As indicated earlier with the exception of output control gates 230*a* through 230*n*, OR gate 240, and interconnecting circuits 235*a* through 235*n*, binary rate multipliers 130 and 131 use a common set of interconnected flip-flops 210*a* through 210*n* and gates 220*b* through 220*n* for generating $(2^n-1)$ pulses from the clock frequency signal. As before *n* equals the number of interconnected flip-flop stages. By routing these pulses to a first set of output control gates 230*a* through 230*n*, and also, to a second set of control gates (not shown but connection thereto indicated by circuits 214', 224', 234', 244' and 254', respectively) two individual pulse trains are generated. The first pulse train on circuit 241 has a number of pulses equal to the numerical value of the first DPCM signal segment while the second pulse train on another circuit, not shown but comparable to circuit 241, has a number of pulses equal to the second DPCM signal segment. This utilization of a common set of interconnected flip-flops 210*a* through 210*n* reduces the amount of circuitry needed to implement binary rate multipliers 130 and 131.

It should be noted that proper timing of the various gates and circuits is necessary for correct operation of the binary rate multipliers, but this detail is omitted herein since the means for effecting proper timing is well documented in the prior art.

In summary up to this point the PCM signals have been converted to a DPCM format, the DPCM signal has been converted from a bit serial organization to a bit parallel organization, the parallel bit organized signal has been partitioned into two segments with the sign bit being associated with each segment, and a train of pulses representing a delta modulated signal format has been generated for each partitioned signal segment. The number of pulses in each train equals the numerical value of the digital signal segment applied to the output control gates 230*a* through 230*n* of binary rate multipliers 130 and 131.

The pulse train out of binary rate multiplier 130 is applied to analog integrator 140 by circuit 138. Analog integrators 140 and 141 are of the sign-controlled type described by R. R. Laane and B. T. Murphy in an article entitled "Delta Modulation Codec for Telephone Transmission and Switching Applications" which appeared in the Bell System Technical Journal, Vol. 49, No. 6, July–August 1970 at pages 1013 through 1031. This pulse train represents the (M–N) most significant signal bits of the unpartitioned DPCM signal. The sign bit held in control register 122 is also applied to analog integrator 140. This connection is made through circuit 136.

In a similar manner the pulse train out of binary rate multiplier 131 is applied to analog integrator 141 via circuit 139. In this case the pulse train represents the N least significant signal bits in the unpartitioned DPCM signal. The sign bit is also applied to analog integrator 141 by circuit 137.

The sign bit indication applied to analog integrators 140 and 141 specifies the polarity of the voltage to be integrated. The number of pulses in the pulse train specify the number of steps in the integration. Consequently, the integrated signal out of analog integrator 140 is proportional to the analog signal represented by the DPCM signal segment comprised of the most significant bits, whereas the corresponding signal out of analog integrator 141 is proportional to the analog signal represented by the DPCM signal segment comprised of the least significant bits. By proper signal level scaling, the proportionality is advantageously converted into an equality.

The analog signal scaling is effected by linear amplifiers 145 and 146. While at first glance it may appear that amplifier 146 could be eliminated, and in theory at least it could, its use is preferred for impedance matching and phase and delay balancing purposes. Circuit 142 connects the output of analog integrator 140 to linear amplifier 145, while the corresponding function in relation to linear amplifier 146 is provided by circuit 143. Amplifiers 145 and 146 have a gain difference which is equal to the numerical difference between the respective quantization weights of each of the partitioned DPCM signal segments. Since amplifier 145 operates on the integrated signal representing the most significant bits, its gain must be substantially higher than that of amplifier 146. In fact, this difference in gain can be expressed mathematically as $$G_2 - G_1 = \Delta G = 20 \log(M-N)$$

where $G_2$ is the gain of amplifier 145, $G_1$ is the gain of amplifier 146, and $\Delta G$ is expressed in decibels.

With the decoded signals properly scaled in magnitude, it remains but to bring the two decoded signals into proper time alignment and to combine them. Bringing the decoded signals into time coincidence is advantageously implemented by connecting the output of linear amplifier 145 through circuit 147 to delay network 149. The output of delay network 149 in turn connects to summing network 151 via circuit 150. Amplifier 146 is connected directly to summing network 151 by circuit 148. The addition of delay network 149 allows for compensation of any delay difference which may accrue because of the difference in gain between amplifiers 145 and 146. With the two decoded signals in time alignment, the combining effected in summing network 151 yields the desired composite analog signal on analog output circuit 152.

Figure 4A:
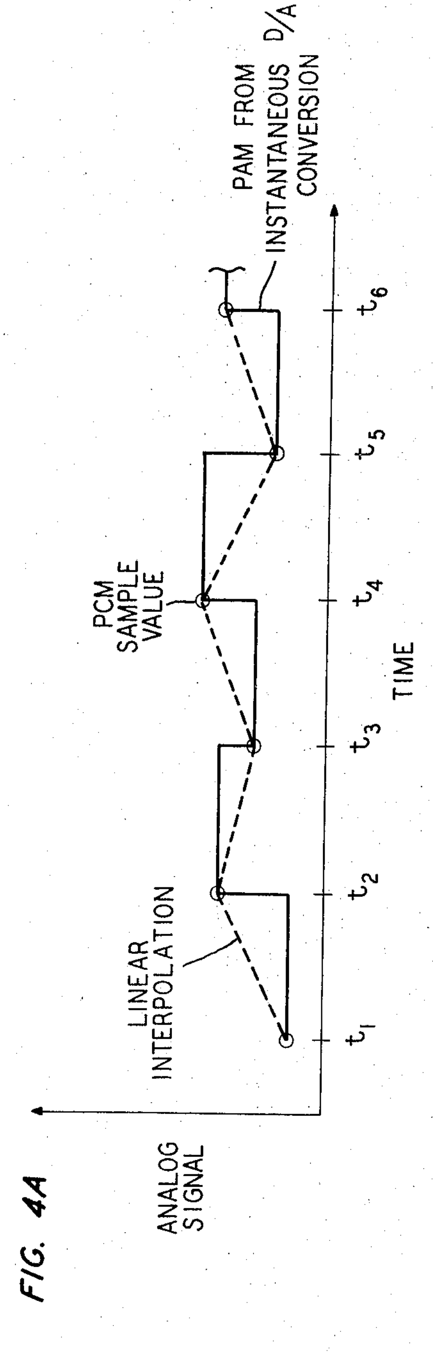
FIG. 4*a* is a graph illustrating the interpolative feature of the method of digital to analog conversion of the present invention as compared to a direct conversion technique.
Figure 4B:
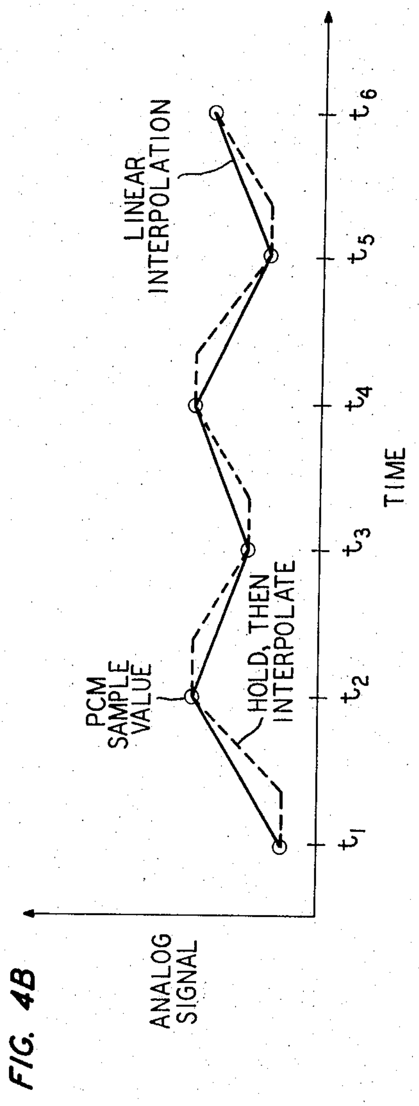
FIG. 4*b* is a graph illustrating the hold and then interpolate feature of the present invention as compared to the straight interpolative approach.

FIG. 4*a* illustrates the analog signal obtained by this technique of digital to analog conversion. Rather than the abrupt step inherent in an instantaneous digital-to-analog conversion, the present technique results in a smooth linear interpolation between the PCM sample values. In another mode of operation the binary rate multipliers 130 and 131 are advantageously operated on a hold and then interpolate basis. This is shown graphically in FIG. 4*b*. This type of operation is used where the clock frequency and the PCM encoding rate are not binary multiples of one another. In such a case the clock source 134, shown in FIG. 1, is operated in a gated mode, whereby clock pulses are inhibited for a period of time corresponding to the hold period and then uninhibited during the interpolate period. This mode of clock operation is effected by resetting a counter in the clock to a negative value at the end of each cycle of operation. A typical cycle is represented by the time interval $t_1$ to $t_2$ shown in FIG. 4*b*. During the negative portion of the count the clock pulses are inhibited. This corresponds to the hold interval. When the pulse count goes positive the clock output is enabled and clock signals are delivered to the binary rate multipliers 130 and 131. This corresponds to the interpolate interval. It should be noted that during the hold interval when no signal pulses are supplied the analog integrators 140 and 141 toggle between a positive and a negative voltage.

While the foregoing description deals with a sign-magnitude representation of the DPCM digital signal, it is to be recognized that a two's complement representation is handled equally as well. Moreover, digital word lengths of less than or greater than 15 bits are readily accommodated. In addition, partitioning the DPCM digital signal into more than two segments for subsequent decoding is also easily achieved.

In summary, a technique and apparatus are described wherein digital signal samples having accuracies on the order of 15 bits are accurately decoded without the need for expensive and laborious matching of component characteristics. Also the technique and apparatus lend itself to mass production techniques such as large scale integration. Finally, the circuit operating speeds are on the order of 2 MHz which is significantly lower than that normally considered necessary to decode signals having accuracies on the order of 15 bits.

Although the present invention has been described in connection with a particular embodiment thereof, further embodiments and modifications which will be apparent to those skilled in the art are included within the scope and spirit of the invention.

What is claimed is:

1. A combination for converting a digital signal to its corresponding analog representation comprised of means for converting pulse code modulated digital signals to differential pulse code modulated digital signals, means for partitioning said differential digital signals into at least two segments with each segment having a quantization weight in accordance with the relative value of said segment in said differential digital signal, means for generating pulse trains having a number of pulses equal to the numerical value of each of said segments, means for integrating each of said pulse trains to obtain an analog signal, means for scaling each of said analog signals in accordance with the quantization weight of the corresponding differential digital segment, and means for combining all of said scaled analog signals to form a composite analog signal equal in magnitude to said original digital signal representation.

2. The combination in accordance with claim 1 wherein the means for converting pulse code modulated digital signals to differential pulse code modulated digital signals comprises means for bringing into time coincidence a first pulse code modulated digital signal with a second such digital signal, said first and second signals occurring in adjacent sample time intervals, and means for subtracting said second pulse code modulated digital signal from said first pulse code modulated digital signal to produce said differential pulse code modulated digital signal.

3. The combination in accordance with claim 1 wherein the signal partitioning means comprises a serial-to-parallel converter, first and second control registers, means for routing a sign bit of said differential pulse code modulated digital signal to a bit position in said first and second control registers, means for applying N of M least significant bits to said first control register where M equals the total number of bits excluding said sign bit, and means for applying (M-N) more significant bits to said second control register.

4. The combination in accordance with claim 1 wherein the means for generating pulse trains comprises means for generating a clock frequency signal, first binary rate multiplier means actuated by said clock frequency signal and controlled by a first segment of said segmented differential pulse code modulated signal such that a first train of pulses representing a delta modulated signal format is generated with the number of pulses in said first train being equal to the numerical value of said first signal segment, and second binary rate multiplier means actuated by said clock frequency signal and controlled by a second segment of said segmented differential pulse code modulated signal such that a second train of pulses representing a delta modulated signal format is generated with the number of pulses in said second train being equal to the numerical value of said second signal segment.

5. The combination in accordance with claim 4 wherein the first and second binary rate multiplier means includes a plurality of interconnected flip-flop circuits for producing $(2^n-1)$ pulses from said clock frequency signal with $n$ being equal to the number of interconnected flip-flops and with said flip-flop circuits being common to both of said binary rate multiplier means, a first set of output control gates connected to said plurality of flip-flops for deriving outputs at selected stages of said flip-flops in correspondence with said first segment of said segmented differential pulse code modulated signal, first combining means for grouping said derived outputs for application to an input of said integrating means, a second set of output control gates connected to said plurality of flip-flops for deriving outputs at selected stages of said flip-flops in correspondence with said second segment of said segmented differential pulse code modulated signal, and second combining means for grouping said derived outputs for application to an input of said integrating means.

6. The combination in accordance with claim 1 wherein the means for scaling the analog signals comprises first and second linear amplifiers with said amplifiers having a gain difference equal to the numerical difference between the respective quantization weights of each of said partitioned differential pulse code modulated signal segments.

7. The combination in accordance with claim 6 wherein said means for scaling introduces different amounts of signal delay into said analog signals in accordance with said gain difference, and said means for combining the scaled analog signals comprises means for bringing said analog signal segments into time alignment, and means for adding said time aligned signal segments.

8. A method for converting a digital pulse code modulated signal to its corresponding analog representation comprising the steps of converting pulse code modulated digital signals to differential pulse code modulated digital signals, partitioning said differential digital signals into at least two segments with each segment having a quantization weight in accordance with the relative value of said segment in said differential digital signal, generating a pulse train for each of said signal segments with said pulse train representing a delta modulated signal format and having a number of pulses equal to the numerical value of each of said segments, integrating each of said pulse trains to obtain an analog signal, scaling each of said analog signals in accordance with the quantization weights of each of said differential digital signal segments, and combining all of said scaled analog signals to form a composite analog signal equal in magnitude to said original digital signal representation.

9. The method in accordance with claim 8 wherein the converting step further includes the steps of bringing into time coincidence a first pulse code modulated digital signal with a second such digital signal, said first and second digital signals occurring in adjacent sample time intervals, and subtracting said second pulse code modulated digital signal from said first pulse code modulated digital signal to produce said differential pulse code modulated digital signal.

10. The method in accordance with claim 8 wherein the partitioning step for producing at least two segments of the differential digital signal for application to a corresponding number of control registers further includes the steps of converting said differential digital signal from a bit serial format to a bit parallel format, routing a sign bit of said differential pulse code modulated digital signal to a bit position in each of said control registers, applying N of M least significant bits to a first one of said control registers, M being equal to the total number of bits excluding said sign bit, and applying (M–N) more significant bits to a second one of said control registers.

11. The method in accordance with claim 10 wherein the pulse train generating step further includes the steps of generating a clock frequency signal, dividing said clock signal into $n$ signal components having binary related frequencies, the first component having a frequency equal to one-half the clock frequency, the second component having a frequency equal to one-half the frequency of the first component with the $n^{th}$ component having a frequency equal to one-half the $(n-1)$ component, and selectively combining said $n$ binary related signal components under the control of said partitioned signal segments applied to said control registers to produce a number of pulses equal to the numerical value of said partitioned signal segments.

12. The method in accordance with claim 8 wherein the combining step further includes the steps of bringing said analog signal segments into time alignment, and adding said time aligned analog signal segments.

* * * * *

Disclaimer

3,831,167.—*Stuart Keene Tewksbury*, Middletown, N.J. DIGITAL-TO-ANALOG CONVERSION USING MULTIPLE DECODERS. Patent dated Aug. 20, 1974. Disclaimer filed Jan. 2, 1976, by the assignee, *Bell Telephone Laboratories, Incorporated.*

Hereby enters this disclaimer to claims 1 through 4 and 6 through 12 of said patent.

[*Official Gazette March 9, 1976.*]